United States Patent [19]

Hashimoto et al.

[11] 4,226,505
[45] Oct. 7, 1980

[54] HOLDING DEVICE FOR A LENS OF AN INTERCHANGEABLE LENS ASSEMBLY

[75] Inventors: Shigeru Hashimoto, Yokohama; Akira Masuda; Katura Mochizuki, both of Kawasaki; Akira Satoh, Ohme; Koshi Takeuchi, Kawasaki; Teruhisa Oda, Sagamihara, all of Japan

[73] Assignee: Canon Kabushiki Kaisha, Tokyo, Japan

[21] Appl. No.: 940,083

[22] Filed: Sep. 6, 1978

Related U.S. Application Data

[62] Division of Ser. No. 722,560, Sep. 13, 1976, Pat. No. 4,152,064.

[30] Foreign Application Priority Data

Sep. 18, 1975 [JP]  Japan ................ 50/112867
Sep. 22, 1975 [JP]  Japan ................ 50/114439
Sep. 25, 1975 [JP]  Japan ................ 50/115782
Sep. 30, 1975 [JP]  Japan ................ 50/117985

[51] Int. Cl.³ ................................. G02B 7/02
[52] U.S. Cl. ..................................... 350/252
[58] Field of Search ............... 350/245, 252, 255; 354/286

[56] References Cited

U.S. PATENT DOCUMENTS 2,095,657  10/1937  Burgess .................. 350/252 UX

FOREIGN PATENT DOCUMENTS 1262041  2/1968  Fed. Rep. of Germany ........... 350/252
2129746  12/1972 Fed. Rep. of Germany ........... 350/255
339046   7/1959  Switzerland .................... 350/252

Primary Examiner—F. L. Evans
Attorney, Agent, or Firm—Toren, McGeady and Stanger

[57] ABSTRACT

A diaphragm linkage device for interchangeable lenses wherein more than three column-shaped guide members with a groove consisting of plastic material with a small friction coefficient are provided around the optical axis of the barrel for the interchangeable lens. A diaphragm linkage ring is adapted in the grooves in such a manner that by means of the guide members the diaphragm linkage ring is carried in the direction of thrust and in the radial direction.

4 Claims, 12 Drawing Figures

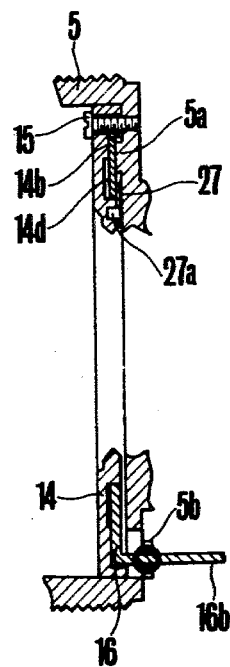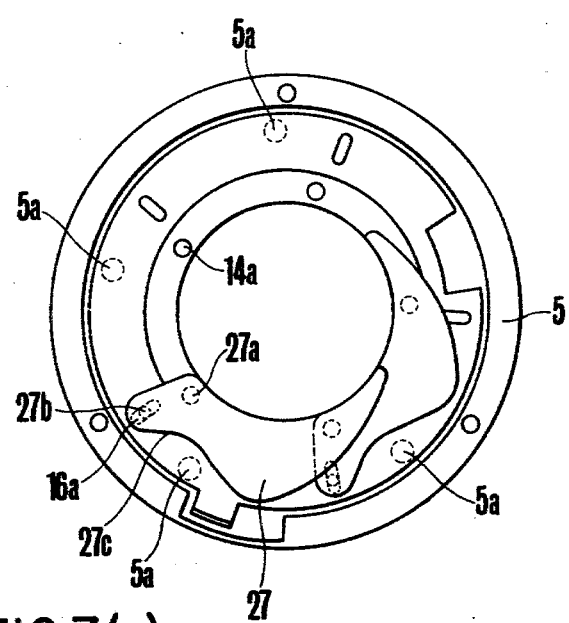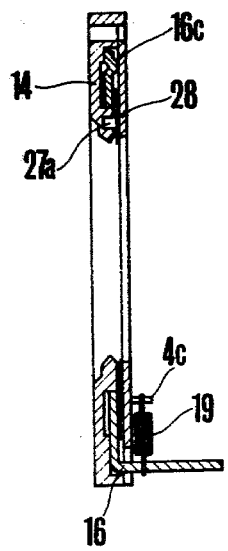

HOLDING DEVICE FOR A LENS OF AN INTERCHANGEABLE LENS ASSEMBLY

This is a division of application Ser. No. 722,560, filed Sept. 13, 1976, now U.S. Pat. No. 4,152,064.

The present invention relates to a diaphragm linkage device for interchangeable lenses.

In situations involving interchangeable lenses where a diaphragm device manually or automatically presettable is in functional engagement with an exposure meter particularly in a single reflex camera having TTL light measuring system, a linkage ring is usually provided. The linkage ring is for transmitting the aperture value to the interchangeable lenses. The aperture value may be determined by means of by an exposure meter or the aperture determination mechanism located at the side of the camera. Additionally, a linkage ring for driving the diaphragm driving ring from the side of camera may also be provided. In any case, it is usually necessary for these rings to be rotated smoothly and precisely by means of a slight spring pressure. Consequently in many cases they are supported on a securing part of the lens barrel by means of ball bearings. Further it is necessary to control the position in the direction along the optical axis and the range of the rotation in a case where ring shaped members such as preset cam ring are rotatably supported on the lens barrel. Until now the movement in the direction along the optical axis has been prevented by means of split washers, or screw rings, with stoppers being provided. However, in this way, the number of parts as well as the time needed for assembling is increased, causing an increase of the manufacturing cost.

The purpose of the present invention is to support the above mentioned linkage ring as well as the preset cam with precision by means of a simple mechanism and to cut down the manufacturing cost of the interchangeable lens by reducing as much as possible the working process of the lens barrel parts as well as the linkage member.

The present invention will be explained in detail by reference to the accompanying drawings depicting a preferred embodiment of the invention.

In the Drawings:

FIG. 7 shows a diaphragm blade support device, with FIG. 7(a) being a partial section; FIG. 7(b) being a plan view; and FIG. 7(c) being a section of a variation.

Figure 1:
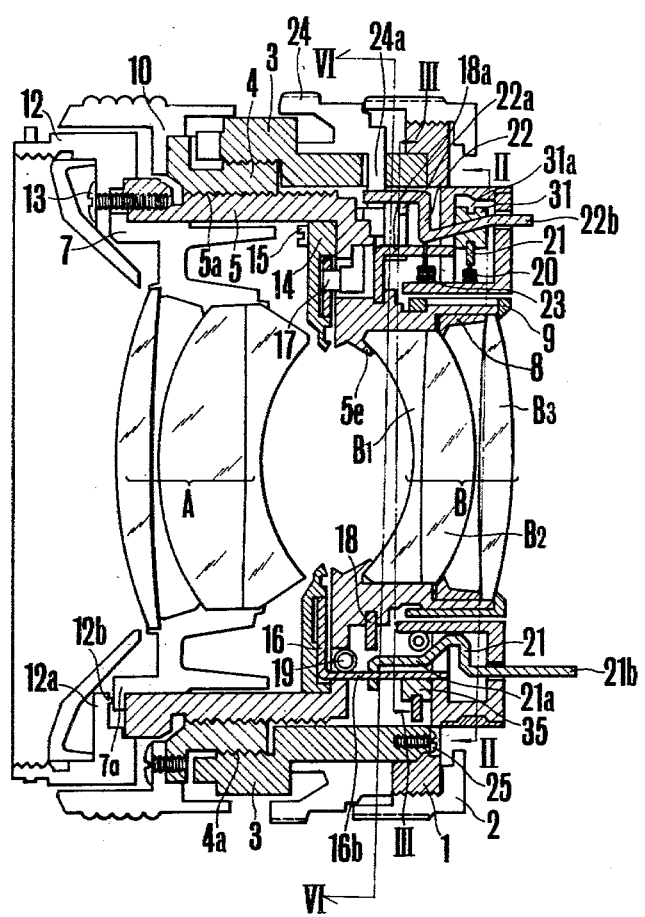
FIG. 1 shows a section of an interchangeable lens in accordance with the present invention.

In FIG. 1, a lens barrel securing part 1 cooperates with a securing ring 2 for mounting the lens barrel around the securing part 1 on the camera by means of the bayonet system. A fixed cylinder 3 is fixed on the securing part 1 by means of a screw 25, and inside of the cylinder 3 a rotary helicoid connected with the distance ring 10 is screwed in. A holding cylinder 5 screwed in the rotary helicoid 4 by means of a helicoid screw 5a, provides a splined connection in such a manner that the holding cylinder 5 is advanced by being guided by means of a key fix on the fix cylinder 3. In the holding cylinder 5, a lens is held by means of a lens frame 7, press rings 8, 9 while the diaphragm blade supporting ring 14 is mounted by means of a screw 15, whereby the diaphragm driving ring 16 is rotatably inserted in the ring. The driving ring 16 is urged by means of a spring 19 in the direction along which the diaphragm is closed, while the arm 16b extending backwards is engaged with the arm 21a of the diaphragm closing ring 21 rotatably supported in the barrel securing part 1 so as to keep the diaphragm totally opened under the force of a strong spring 20. A bell crank 17 linked on the holding cylinder, is rotated under the control of the diaphragm control ring 18 so as to limit the rotation of the diaphragm blade driving ring.

A front frame 12 is connected with the holding cylinder 5 together with the lens frame 7 by means of a screw 13, presenting accessary mounting parts such as a filter screw and the bayonet. An aperture setting ring 24 presenting an aperture scale on the circumference is provided so as to be rotatable around the fixed cylinder 3, whereby the abutment 24a is engaged with the diaphragm control ring 18 through the preset linkage ring 22 in such a manner that the aperture is preset in accordance with the rotation of the setting ring 24.

Figure 3:
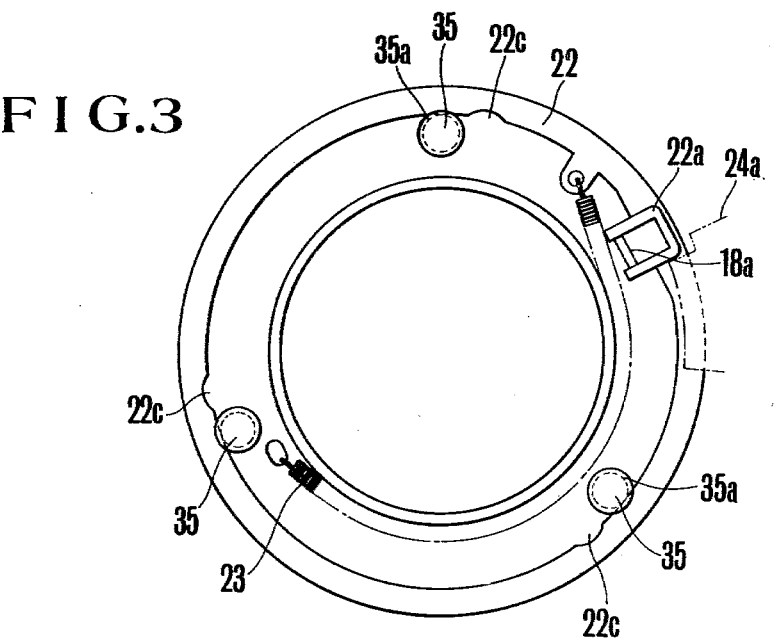
FIG. 3 shows a section along the line III—III of FIG. 1.

The preset linkage 22 is rotatably supported in the barrel securing part 1, being urged along the counter-clockwise direction in FIG. 3 by means of the spring 23, whereby the engagement arm 22a is engaged with the abutment 24a of the aperture setting ring 24 while the arm 22b extending backwards is engageable with the exposure meter link member in the camera body not shown in the drawing.

In functional engagement with the releasing of the shutter a diaphragm closing lever (not shown) at the side of the camera rotates the ring 21 against the force of the spring 23, acting upon the arm 21b, when the diaphragm driving ring 16 rotates by means of the force of the spring 19 until it stops in contact with the bell crank preset by means of the preset cam 18, when the aperture is decided.

Figure 2:
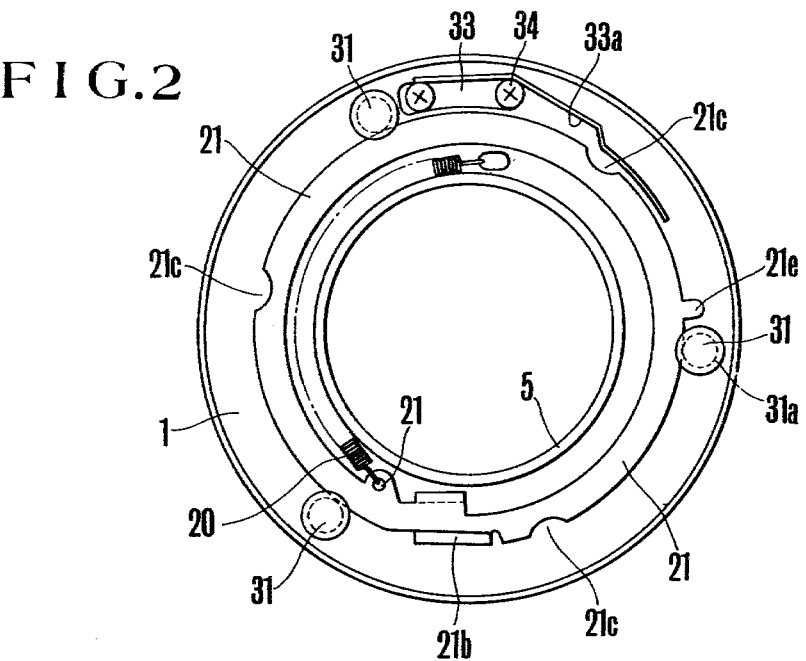
FIG. 2 shows a section along the line II—II of FIG. 1.

FIG. 2 shows the diaphragm closing ring 21 in the state supported in the lens barrel securing part 1. Three guide pins 31 are provided spaced approximately equiangularly from each other around the optical axis of the barrel centrally securing part 1 each consisting of plastic materials with a small friction coefficient and each presenting a ring groove 31a with a width so as to allow the diaphragm closing ring 21 to be tightly fitted in the groove.

On the diaphragm closing ring 21 there are provided three concave parts 21c for receiving the guide pins, whereby when the concave parts 21c are fitted to the guide pins at the outside of the operating zone of the diaphragm ring 21, pushed down to the position of the grooves 31a and turned to the right and the left, the circumference of the diaphragm closing ring 21 is kept in the grooves 31a in such a manner that the ring 21 can not move along the direction of the optical axis while the ring 21 is supported by bearings along the radial direction, the circumference being kept on the bottom of the grooves.

The number of guide pins and of corresponding concave parts 21c is optional if more than three. However, they must be so chosen that the operating angle of the ring 21, namely the angle in which the diaphragm blade driving ring 16 rotates from the position of the totally opened diaphragm to that of the most closed diaphragm, does not surpass the angle between the guide pins.

The shape of the guide pins need not necessarily be circular as is shown in the drawing and a semi-circular or polygonal shape may be utilized so long as the parts in contact with the preset link ring are of a shape matching the groove so as to hold the ring. It goes without saying that in this case a smoother rotation can be obtained if the guide pins are constructed as rollers.

Beside the above mentioned engagement arms 21a, 21b, the ring 21 presents a projection or a hole 21d for fixing a spring in such a manner that by means of the spring provided between the lens barrel securing part and the hole 21d the securing part is urged along the direction in which the diaphragm blades are opened, being kept at a position at which the blades are totally opened by means of the bell crank through the driving ring 16, while some cameras do not present any means for driving the diaphragm closing ring 21. In this case, the diaphragm closing ring 21 is clamped by means of the arm 21b of the ring 21 out of the operation range beyond the smallest diaphragm opening, whereby the diaphragm can manually be opened and closed by rotating the setting ring 24 under the influence of the diaphragm spring 19.

In the drawing, 33 is the clamping spring, being mounted on the lens barrel securing part by means of a small screw 34, whereby when the ring 21 is rotated out of the operation range, the clamping spring 33 is engaged with the projection 21e provided on the ring 21 by means of the stepped part 33a of the arm so as to obtain clamping against the force of the spring 20.

The distance between the guide pins should be determined taking into consideration the rotation angle of the ring 21 up to the clamping position.

FIG. 3 shows the holding method of the preset link ring 22. Guide pins 35 each provide a groove 35a similar that of the grooves 31, while the ring 22 is provided with the corresponding concave parts 22c, being provided rotatably around the optical axis in the same way as in case of the ring 21.

A smooth rotation can be obtained when the rings 21 and 22 are made of pressed metal sheet with the contact surfaces of the guide pins being polished, so that they can operate without difficulties even if there are concave parts or projecting parts. The guide members can be made of plastic materials as explained above so that in comparison with conventional bearing means the working of the parts, their assembly and the like can be carried out with greater ease. This contributes to reduction of the manufacturing costs.

Figure 4:
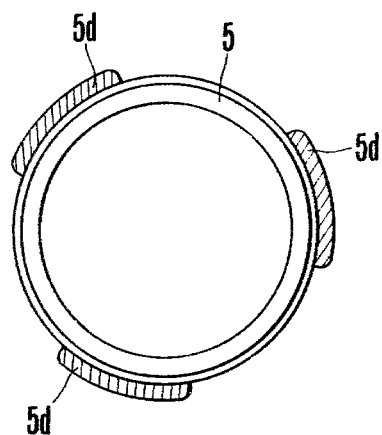
FIG. 4 is a plan view for showing the shape of the bayonet claw.
Figure 5:
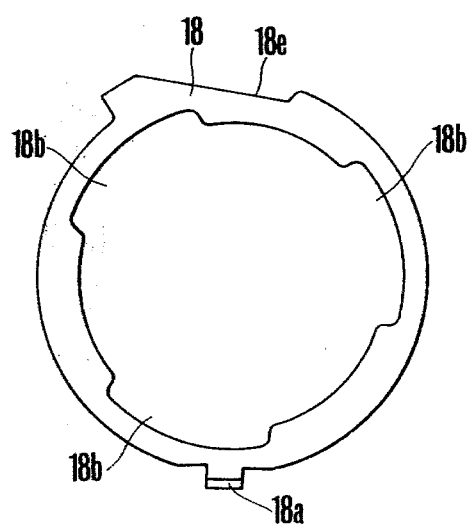
FIG. 5 is a plan view for showing the shape of the aperture control ring.
Figure 6:
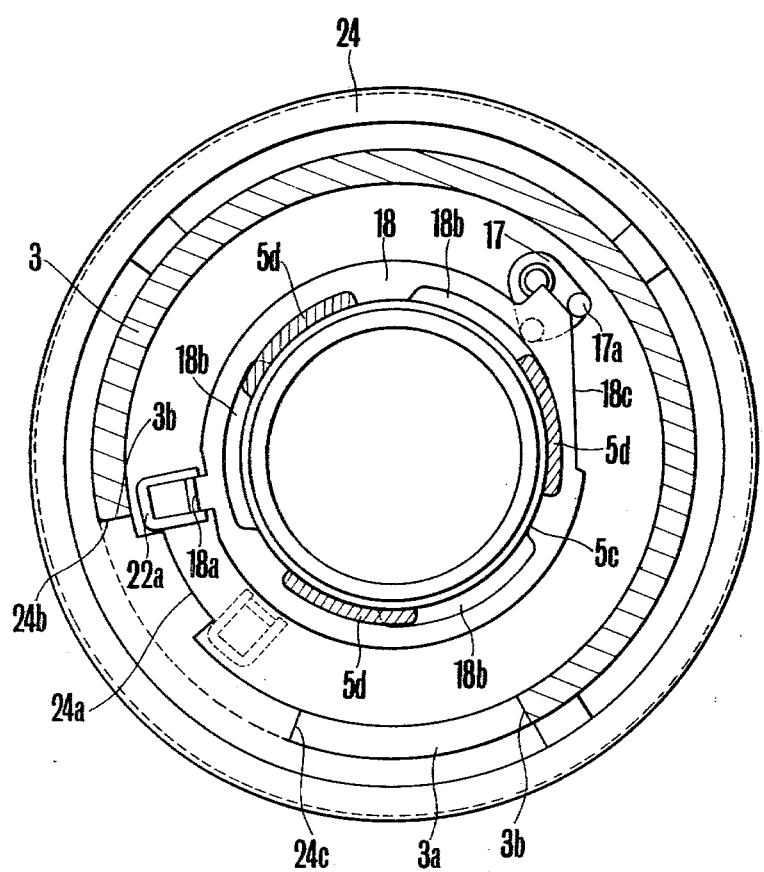
FIG. 6 shows a section along the line VI—VI of FIG. 1.

The holding operation of the control ring will be best understood by reference to FIGS. 4 to 6.

On the cylindrical part 5c of the holding cylinder 5, on which part the cam ring 18 formed out of plastic materials is adapted, three bayonet claws 5d are provided almost at an equal distance as is shown in FIG. 4, while around the central hole of the control ring 18 three cavities 18b corresponding to the above mentioned claws are provided as is shown in FIG. 5.

In order to mount the control ring 18 on the holding cylinder 5, after the holding cylinder 5 is combined with rotary helicoid 4 and fixed cylinder 3 to determine its relative position by the combination key 6, and then adapted on the cylindrical part 5c, the cavities 18b are put in alignment with the corresponding claws 5d. At this time the cam 18c of the control ring 18 is out of the pin 17a of the bell crank. Namely the ring 18 is mounted on the holding cylinder 5 at the position out of the operation range. The control ring 18 is rotated out of this position until the cam part 18c enters into the operation range in which the cam part 18c is engaged with the pin 17a of the bell crank, when the ring 18 is engaged with the bayonet claw 5d.

Then the aperture setting ring 24 is adapted to the fixed cylinder 3 after it is positioned in such a manner that the projection 24a can move in the cavity 3a provided at the end of the fixed cylinder. Then, the securing ring 2, the preset ring 22, the diaphragm closing ring 21 and the like are fixed by means of a screw after the lens barrel securing part 1 is combined with the fixed cylinder at a certain determined position. At this time the arm 18a of the control ring 18 is adapted to the folded, C-shaped arm 22a of the preset ring 22, while the arm 22a is engaged with the projection 24a of the aperture setting ring, being drawn by means of the spring 23. FIG. 6 shows the state in which the aperture is preset at the totally opened value, whereby the projection 24a of the aperture setting ring 24 is engaged with the one end of the cavity 3b of the fixed cylinder with the flank 24b, so as to be stopped by means of a click stop (not shown) against the force of the spring 23.

When the aperture setting ring 24 is rotated along the counter clockwise direction out of this position, the preset ring 22 moves, being drawn by means of the spring 23 so as to rotate the control ring 18 along the same direction, displacing the bell crank 17 by means of the cam part 18c in such a manner that the aperture is preset at a value corresponding to the scale on the aperture setting ring. When the aperture setting ring 24 has rotated down to the position of the smallest diaphragm opening, the flank 24c of the projection 24a is in contact with the other end of the cavity 3b whereby the aperture setting ring 24 can not rotate any more. In this operation range between the largest and the smallest diaphragm opening the control ring 18 is engaged with the bayonet claw 5d and therefore the rotation of the aperture setting ring 24 is limited in the operation range as mentioned above so that in the assembled state of the lens the control ring 18 is kept so as to be rotatable, whereby there is no danger that the ring 18 will move out backwardly.

The holding operation of the diaphragm blades will be best understood by reference to FIG. 7(a) and (b) which show respectively, a section and a plan view of the diaphragm blade supporting part, whereby the blade supporting ring 14 consists of plastic materials, being secured on the holding cylinder 5 by means of a screw 15 as mentioned above, while the blade driving ring 16 is adapted in the ring groove 14d provided inside of the supporting ring 14 so as to be rotatable.

On each diaphragm blade 27, two pins 27a and 27b are fixed whereby the pin 27a is adapted in the hole 14a provided on the support ring 14 while the pin 27b is adapted in a long hole 16a provided on the driving ring 16 in such a manner that the blade 27 is supported between the holding cylinder 5 and the driving ring 16 so as to be rotated around the pin 3a by means of the rotation of the ring 16.

A projection 5a is integrally formed on the holding cylinder 5 whereby the driving ring 16 is clamped between the holding cylinder 5 and the face 14b of the concave part 14d of the supporting ring 14, so as to be restricted in the translation along the direction of the optical axis.

Although it is essential to provide the projection 5a near the circumference of the driving ring 16 and at the position at which the projection 5a is not in contact with the back of the blade in all the operation ranges from the largest to the smallest diaphragm opening, it is sufficient to provide a concave part 27c on each blade as is shown in FIG. 7(b) in such a manner that the movement of the blade is not hindered even when the projections 5a are in the operation area of the diaphragm blade. This is because the driving ring 16 can be made small without fear that the diaphragm device as a whole will become too large.

Furthermore, projections 5b are formed integrally with the holding cylinder 5, so as to facilitate mounting of the spring 19.

Although in the present embodiment the projections 5a are formed integrally on the holding cylinder 5, instead of the projections 5a the projections 16c can also be provided on the driving ring 16 as is shown in FIG. 7(c).

Although it is preferred from a manufacturing view point to provide the press plate 28 in a manner similar to the conventional blade holding device whereby the press plate 28 can be made of a pressed metal sheet, the manufacturing procedures can be simplified when the spring hanger 28c is formed integrally from plastic materials.

Figure 8A:
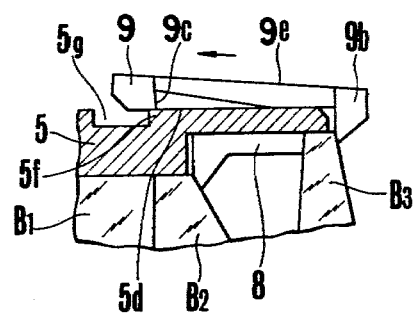
FIG. 8 shows a lens holding device, being FIG. 8(a) and FIG. 8(b) each being a partial section.
FIG. 8(c) showing a press ring in perspective view.
Figure 8B:
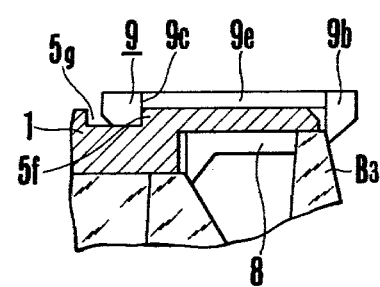
Figure 8C:
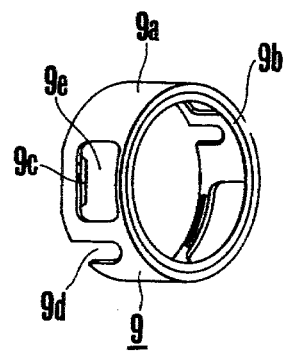

In the lens holding device shown in FIGS. 1 and 8, a front lens group A is fixed in the lens frame 7 mounted in the lens holding cylinder 5 by means of small screws 13.

The holding cylinder 5, the lens frame 7 and the front frame 12 are formed out of plastic materials. In order to avoid deformation of the helicoid screw due to the securing by the screw 13, the three projections 12b are provided on the back of the mounting part 12a of the front frame 12 so as to be in contact with the flange 7a of the frame between the screws 13 in such a manner that when the screws 13 are secured, the frame 7 is pressed elastically against the holding cylinder 5.

The rear lens group $B_1$, $B_2$ consists of cemented lenses, being adapted in the rear part of the holding cylinder, whereby the circumference of the front part is in contact with the adapting part 5e while between the rear part and the lens $B_3$ a spacer 8 is provided, the rear surface of the lens $B_3$ being retaining by the press ring 9.

The retaining ring 9 consists of thin flexible plastic material as is shown in FIG. 8, consisting of the principal part 9a to be adapted on the circumference 5d of the holding cylinder, the press part 9b to be in contact with the lens $B_3$ and three claws 9c to be adapted in the groove 5g on the circumference of the holding cylinder so as to be engaged with the stepped part 5f. The principal part 9a is divided in three parts by means of the three notches 9d while between the lens press part 9b and each claw a hole 9e is provided in such a manner that the principal part is deformable with an adequate elasticity.

When the retaining ring 9 is adapted on the circumference of the holding cylinder, and is pushed on after the lenses $B_1$, $B_2$, $B_3$ and the spacer 8 are put into the holding cylinder 5, the principal part is enlarged due to the notches 9d and adapted in the state shown in FIG. 8(a), whereby the press part stops at the position at which the part is in contact with the rear surface of the lens $B_3$. The distance between the press part 9b and the claw 9c is chosen smaller than that between the surface of the lens $B_3$ and the stepped part 5f so that in the above mentioned state the claws are not engaged with the stepped part 5f. When then the claws 9c are pushed along the direction of the arrow by means of a proper tool inserted through the holes 9e, the claws become loose and engage in the groove 5g while the claws 9c engage with the stepped part 5f, clamping the lens $B_3$ with the press part 9b so as to press the lens with an adequate elasticity so that the lens is held with sureness without deformation or the like.

Quite different from the conventional lens press ring it is not necessary to give any rotation to the above mentioned lens press ring whereby by simply translating the ring along the direction of the optical axis the lens press ring can be mounted in such a manner that the lens can be held with an adequate elasticity without adjusting the securing torque of the press ring. Thus, the present invention can be advantageous not only for the automatic assembling but also for manual assembling.

Further from the view point of the manufacture of parts the press ring can be formed out of plastic material while simple grooves are provided on the lens barrel, which is a very simple process in comparison with the process for threading a press ring and a lens barrel. Thus, the present invention contributes much to the simplification of the assembling process as well as to reduction of manufacturing costs.

What is claimed is:

1. A lens holding device comprising, in combination: a lens element defining an optical axis and having a cylindrical outer circumferential plane; a holding member to hold said lens element, said holding member including a cylindrical part fitted with the outer circumference of said lens element, a receiving portion on a radially inner side of said cylindrical part to receive one surface of said lens element and one stepped portion on a radially outer side of said cylindrical part and axially located toward one side thereof; a flexible retaining ring fitted on said holding member to retain said lens element at said holding member, said retaining ring including a pressing part which is provided at one end of said retaining ring and which contacts said lens element on a side thereof facing away from said side where said stepped portion is located, and an engagement part engaging against the stepped portion of said holding member; said lens element being pressed toward the receiving portion by the elasticity of said retaining ring when said engagement part engages with the stepped portion of said holding member with said lens element being thus so retained within the holding member as to prevent shifting thereof in the direction of the optical axis.

2. A lens holding device according to claim 1 wherein said flexible retaining ring is in a cylindrical form with a plurality of holes provided on a cylindrical portion between said pressing part and said engaging part, said retaining ring being elastically deformed in the longitudinal direction parallel to the optical axis of the lens to fix the lens element to the holding member.

3. A lens holding device according to claim 1 wherein said flexible retaining ring is in a cylindrical form, and wherein said engagement part is divided by a plurality of notches and is elastically deformable in the diametrical direction.

4. A lens holding device according to claim 1 wherein said flexible retaining ring is made of plastics.

* * * * *